May 22, 1923.
G. E. MARSHALL
CAN OPENER
Original Filed July 1, 1921
1,456,246
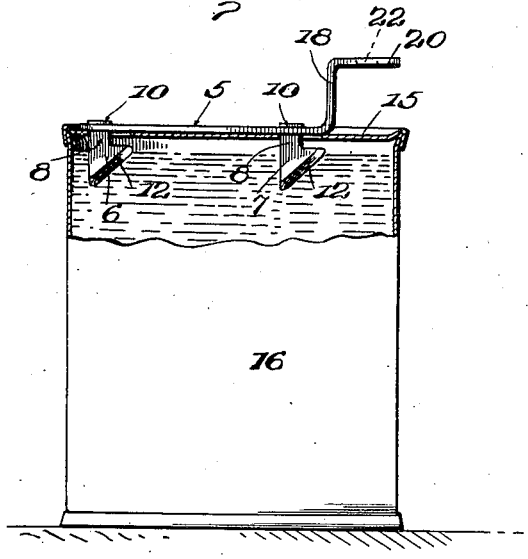
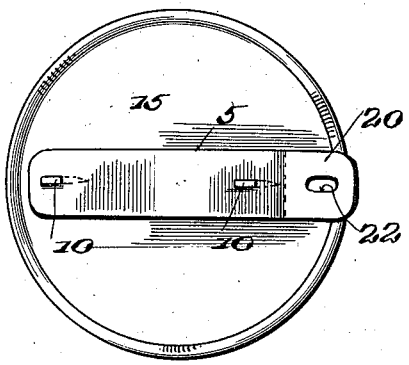
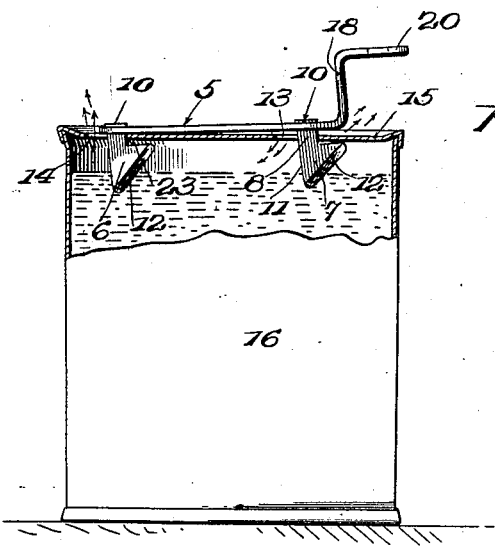
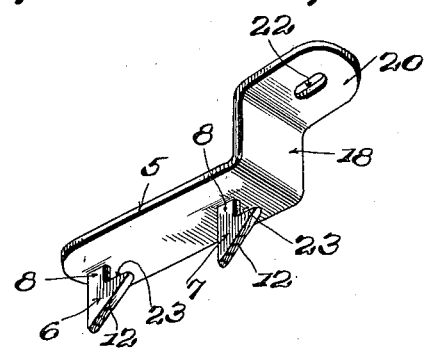
INVENTOR
George E. Marshall Patented May 22, 1923.

1,456,246

UNITED STATES PATENT OFFICE.

GEORGE E. MARSHALL, OF SAN DIEGO, CALIFORNIA.

CAN OPENER.

Application filed July 1, 1921, Serial No. 481,817. Renewed March 30, 1923.

*To all whom it may concern:*

Be it known that I, GEORGE E. MARSHALL, a citizen of the United States, residing at San Diego, in the county of San Diego and State of California, have invented certain new and useful Improvements in Can Openers, of which the following is a specification.

This invention relates to can openers especially adapted for use in connection with cans containing evaporated milk and other liquids.

An important object is to provide a can opener by means of which the evaporated milk or other liquid may be discharged directly from the original container on to the food whereby the original container may be conveniently used at the table.

Further, the invention aims to provide a can opener having means for preventing the air inlet and liquid discharge openings from becoming clogged with dried milk or other liquid.

Also, the invention aims to provide novel means whereby the contents of the can may be kept in a clean and sanitary manner by the exclusion of foreign matter.

A further object is to provide a can opener which is simple to operate, durable in use and cheap to manufacture.

Other objects and advantages of the invention will be apparent during the course of the following description.

In the accompanying drawing forming a part of this application and in which like numerals are employed to designate like parts throughout the same, Figure 1 is a side elevation of the improved can opener applied, the can opener being shown flatly in contact with the top of the can to close the openings in the same for the purpose of excluding foreign matter.

Figure 2 is a side elevation of the same applied, the device being shown in the position it occupies during the discharge of the liquid.

Figure 3 is a plan view of the opener applied.

Figure 4 is a perspective of the opener.

In the drawing the numeral 5 designates an elongated strip of metal constituting the body of the device and to which are connected penetrating blades 6 and 7 by means of reduced shanks 8 extended through openings in the body and upset as indicated at 10 whereby the blades are securely connected to the body. As illustrated in Figures 1 and 2, the edges 11 of the blades 6 and 7 extend at right angles to the plane of the body while the cutting edges 12 extend diagonally of the blades whereby the downward movement of the device will simultaneously form an air inlet opening 13 and a liquid discharge opening 14 in the top 15 of the can 16. Since the top face of the metallic body 5 is flat the same forms a convenient means whereby the blades 6 and 7 may be pressed downwardly by the operator for the purpose of forming the openings 13 and 14. The rear ends of the diagonally extending cutting edges 12 terminate laterally of the adjacent edges of the reduced shanks 8 thereby forming what might be termed sockets for the reception of the portions of the top 15 adjacent the blades.

When the blades 6 and 7 are forced through the top the openings 13 and 14 formed thereby are longer than the width of the shanks 8 whereby the body is capable of a slight longitudinal movement. Therefore the device may be positioned as illustrated in Figure 1 for entirely closing the openings or it may be positioned as illustrated in Figure 2 for the purpose of permitting the contents of the can to be discharged.

When it is desired to discharge the contents of the can the body 5 is moved longitudinally so that one wall of the opening 14 is received within the socket of the blade 16 and so that the socket formed in the blade 7 receives that portion of the top adjacent the opening 13. Consequently the air may pass beneath the body 5 and enter the can by means of the opening 13. The air upon entering the can permits the liquid to be discharged through the opening 14. By moving the body longitudinally the reduced shanks 8 are moved from end to end in the openings 13 and 14 for keeping the same free of dried evaporated milk and the like.

The body 5 is formed adjacent its rear end with an offset 18 defining a manipulating element or handle 20 arranged in spaced parallel relation to the body and adapted to be engaged by the operator when it is desired to elevate the rear end of the body as illustrated in Figure 2. An opening 22 may be formed in the manipulating element for the purpose of permitting the device to be suspended from a nail or the like. The offset 18 constitutes a stop element which is engaged by the finger of the operator when lifting the rear portion of the device.

In use, the device may be allowed to remain attached to the can until the contents of the can have been used. The laterally projecting shoulders 23 formed at the sides of the shanks 8 prevent the device from becoming accidentally disconnected from the can.

Having thus described the invention what is claimed is:—

A can opener comprising a flat elongated body, and blades having reduced attaching shanks connected to said body adjacent the ends of the same, said blades being formed with edges arranged at right angles to the plane of the body and with diagonally extending can cutting edges, said cutting edges terminating laterally of the edges of said shanks thereby forming shoulders adapted to engage the top of a can to retain the opener in position, the width of each of said attaching shanks being substantially less than the opening formed by each blade whereby the body may be moved longitudinally when applied, said body constituting a closure extending over said openings for closing the same, the body being formed at its rear end with an offset defining a handle and a stop.

In testimony whereof, I have affixed my signature in the presence of two witnesses.

GEORGE E. MARSHALL.

Witnesses:
   F. SPALDING,
   CHAS. B. NEVENS.